United States Patent
Rangel et al.

(10) Patent No.: US 7,623,526 B2
(45) Date of Patent: Nov. 24, 2009

(54) NETWORK INTERFACE FOR A WIRELESS COMMUNICATION DEVICE

(75) Inventors: Ryan Rangel, Raleigh, NC (US); Samuel L. Mullis, II, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 450 days.

(21) Appl. No.: 11/461,118

(22) Filed: Jul. 31, 2006

(65) Prior Publication Data

US 2008/0025343 A1    Jan. 31, 2008

(51) Int. Cl.
| | |
|---|---|
| H04J 3/22 | (2006.01) |
| H04L 12/56 | (2006.01) |
| H04J 3/24 | (2006.01) |
| H04W 4/00 | (2009.01) |
| H04M 3/42 | (2006.01) |

(52) U.S. Cl. .................. 370/395.5; 370/466; 370/474; 455/466; 455/414.1

(58) Field of Classification Search .................. 370/352, 370/401, 300, 310, 392, 395.1, 395.5, 400, 370/466, 474; 455/432.1, 414.1, 466
See application file for complete search history.

(56) References Cited

U.S. PATENT DOCUMENTS 6,078,820 A    6/2000 Wells et al.

(Continued)

FOREIGN PATENT DOCUMENTS

WO    WO 2004099919 A2 * 11/2004

OTHER PUBLICATIONS

How to Turn a GSM SIM into a WEb Server—Guthery et al. (2000).*
Guthery et al. (How to Turn a GSM SIM into a Web Server- 2001).*
International Search Report w/ Written Opinion, International Application No. PCT/US2007/062177, Date of Mailing: Dec. 27, 2007.

(Continued)

*Primary Examiner*—Jayanti K Patel
*Assistant Examiner*—Christopher T Wyllie
(74) *Attorney, Agent, or Firm*—Coats & Bennett, P.L.L.C.

(57) ABSTRACT

A communication device includes a network interface that communicatively interfaces an IP protocol layer and an SMS protocol stack. The network interface includes an adaptation layer that receives IP packets from the IP protocol layer, and outputs the IP packets to the SMS protocol stack. A transmitter circuit transmits the SMS messages, which encapsulate the IP packets, to a remote device via a communication network. The adaptation layer also receives specially designated SMS messages from the SMS protocol stack. The received SMS messages include encapsulated IP packets. Upon receipt, the adaptation layer processes the SMS messages, and delivers the IP packets decapsulated from the SMS messages to an application through the IP protocol layer.

24 Claims, 7 Drawing Sheets

U.S. PATENT DOCUMENTS

| | | | |
|---|---|---|---|
| 6,847,632 B1* | 1/2005 | Lee et al. | 370/352 |
| 7,069,436 B1* | 6/2006 | Akachi | 713/162 |
| 2002/0077133 A1 | 6/2002 | Mizell et al. | |
| 2003/0135376 A1* | 7/2003 | Harada | 704/275 |
| 2004/0103270 A1* | 5/2004 | Vinnnakota et al. | 712/241 |
| 2005/0002407 A1* | 1/2005 | Shaheen et al. | 370/401 |
| 2005/0220079 A1* | 10/2005 | Asokan | 370/352 |
| 2005/0227688 A1* | 10/2005 | Li et al. | 455/432.1 |
| 2008/0233981 A1* | 9/2008 | Ismail | 455/466 |

OTHER PUBLICATIONS

Guthery S., Posegga J.: "The WebSIM—Clever Smartcards Listen to Port 80" [Online] Dec. 15, 1999, XP002461126, URL: http://citeseer.ist.psu.edu/cache/papers/cs/15868/http:zszzszwww.scdk.comzszwebsim.pdf/guthery99websim.pdf.

Guthery S et al: "How to Turn a GSM SIM into a Web Server" XP002356354.

* cited by examiner

NETWORK INTERFACE FOR A WIRELESS COMMUNICATION DEVICE

BACKGROUND

The present invention relates generally to network interfaces for wireless communication devices and particularly to a network interface that allows Short Message Service (SMS) messages to carry Internet Protocol (IP) packets.

Typically, wireless communication devices include a network interface that interfaces the wireless communication device to one or more communication networks such as circuit-switched and packet-switched networks. Most network interfaces have a layered protocol structure with each layer performing a specific function. The "higher" layers such as an application layer include an application that permits a user to interact with the wireless communication device and communicate with one or more remote parties. The "lower" layers such as the link layer include the functionality that allows the wireless communications device to communicate wireless signals over a network interface. One or more intermediate layers between the application and link layers function to maintain communications sessions and route data.

An example of an intermediate layer is an Internet Protocol (IP) layer. The IP layer is a network layer protocol that uses IP addresses to route data packets. Usually, the wireless communication device obtains an IP address upon connection to a packet-switched network. The IP layer receives data packets from the application layer via a transport layer (e.g., TCP or UDP), and forwards the data packets with appropriate headers to a network interface such as an air interface for transmission to the network. In the opposite direction, the IP layer receives the data packets from the network via the network interface and one or more intervening layers, and sends the data packets to the application layer via the transport layer.

Currently, some protocols operating on the wireless communication device such as SMS do not communicate data through the IP layer. However, a network interface that interfaces the IP layer and the SMS protocol stack could be useful in a variety of scenarios.

SUMMARY

A communication device includes a network interface having a multi-layer structure. The network interface comprises an adaptation layer that interfaces an SMS protocol stack operating on the communication device with an IP protocol layer. The adaptation layer receives IP packets from the IP protocol layer, processes the IP packets for encapsulation in one or more SMS messages. A transmitter circuit then transmits the one or more SMS messages to a remote communication device via a communication network.

The adaptation layer also receives SMS messages that include encapsulated IP packets. Upon receipt of the SMS messages, the adaptation layer processes the SMS messages and forwards the IP packets to the IP protocol layer. The IP protocol layer processes the IP packets further, and forwards the processed data to an application executing on the communication device through additional protocol layers.

DETAILED DESCRIPTION

The present invention is a network interface residing on a communication device. In one embodiment, the network interface includes an adaptation layer that interfaces an SMS protocol stack operating on the communication device with an IP protocol layer that is also operating on the communication device. For outgoing messages, the adaptation layer processes one or more IP packets received from the IP protocol layer for encapsulation in one or more specially designated SMS messages that are transmitted to a remote communication device over a circuit-switched network. For incoming messages, the adaptation layer processes IP packets encapsulated in one or more specially designated SMS messages received from the circuit-switched network, and routes those IP packets to the IP protocol layer for delivery to an application.

Figure 1:
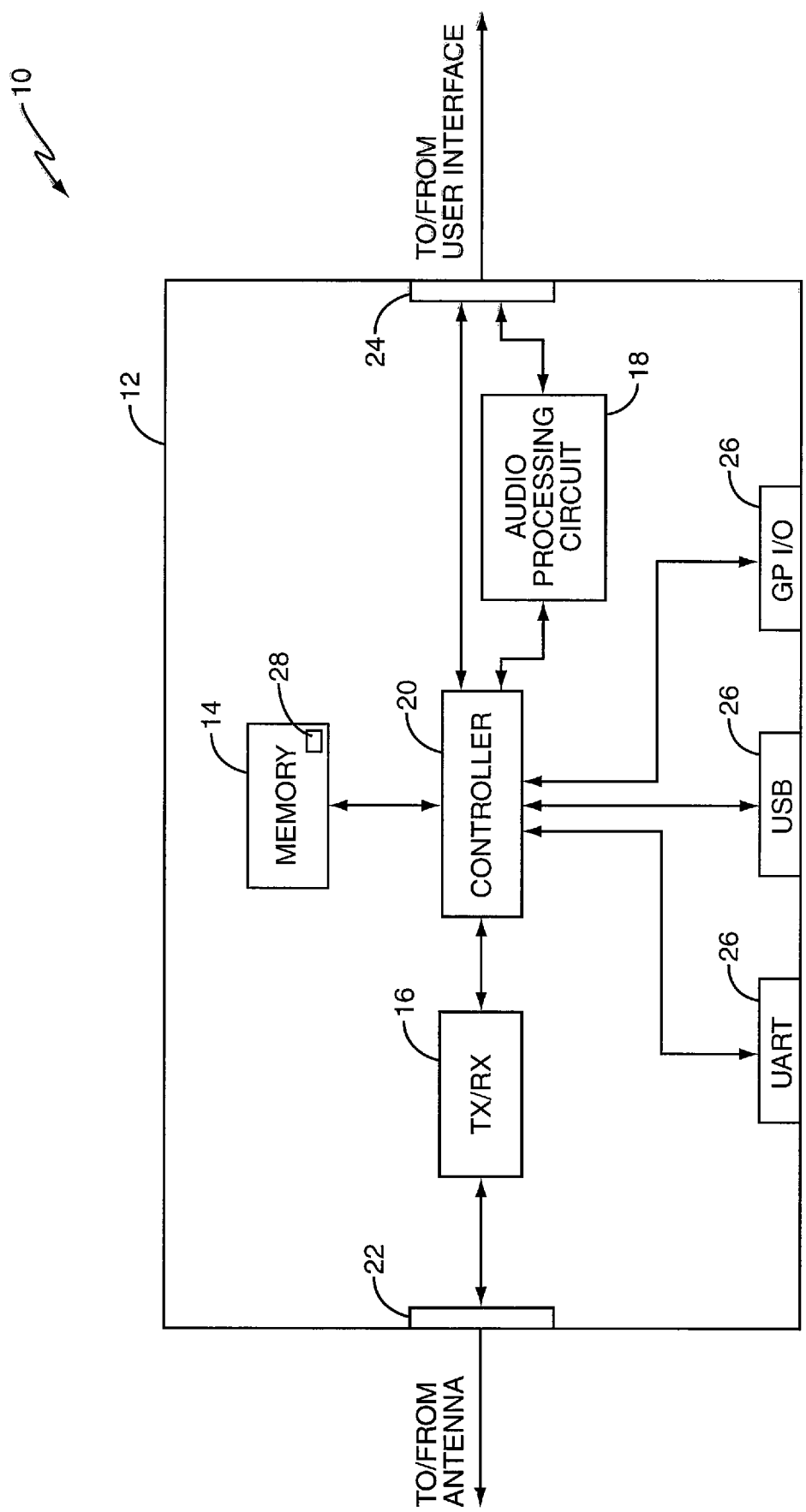
FIG. 1 is a block diagram that illustrates a communication module configured according to one embodiment of the present invention.
Figure 2:
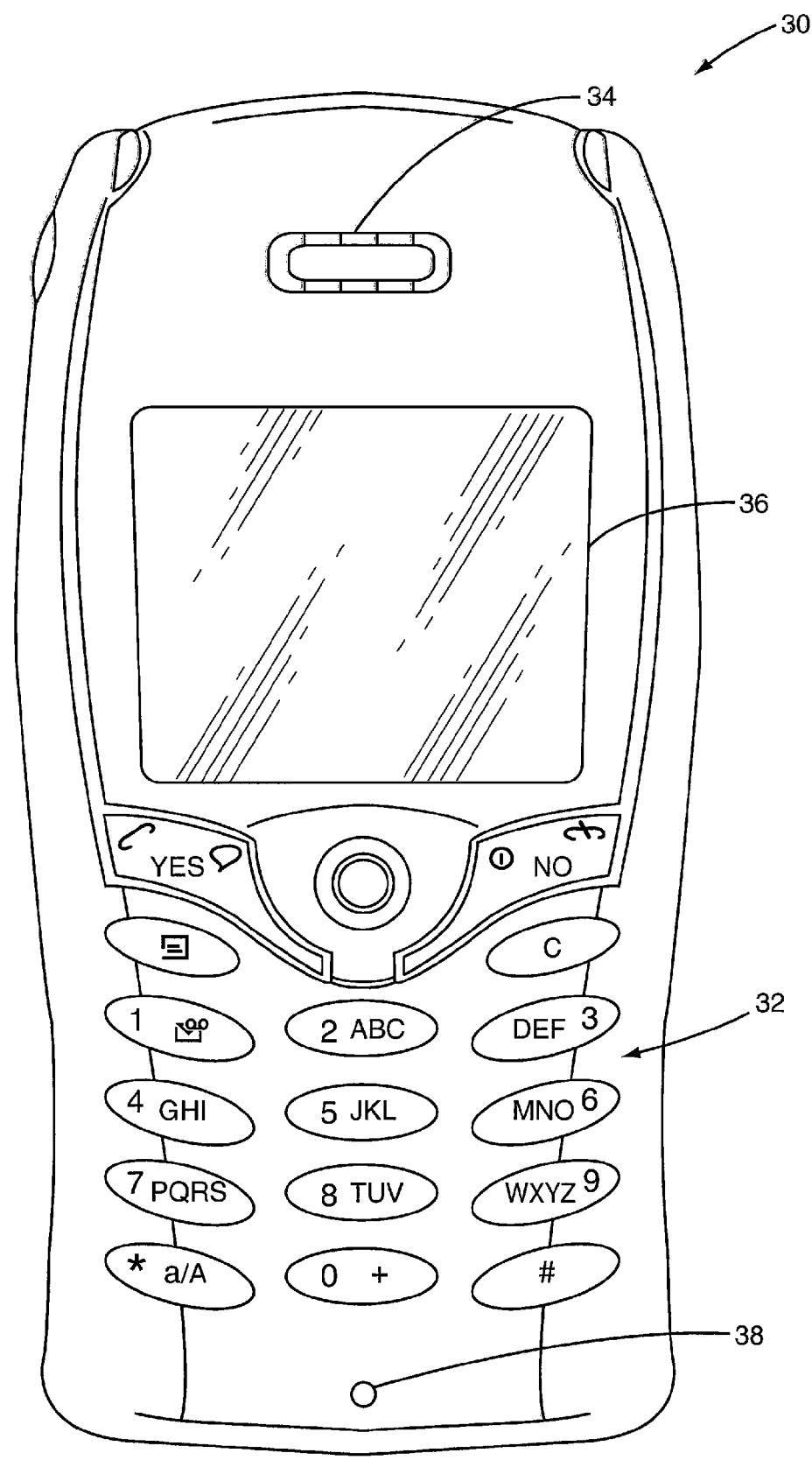
FIG. 2 is a perspective view of a wireless communication device that includes a communication module configured according to one embodiment of the present invention.

The present invention may be embodied, for example, in a communication module 10 (FIG. 1) for a wireless communications device 30 (FIG. 2). The exemplary communication module 10 is a self-contained unit that integrates the circuitry necessary for communicating with one or more remote parties over circuit-switched and packet-switched networks. The communication module 10 typically does not include the components required for a user interface, but does comprise the busses, connections, and circuitry required to electrically connect the communication module 10 to a user interface. In one embodiment, the communication module 10 may be disposed in a cell phone; however, such an embodiment is not limiting. As described in more detail below, communication module 10 may be disposed in any device capable of communicating signals and/or data over a communication network.

As seen in FIG. 1, communication module 10 comprises a housing 12, a memory 14, a transceiver circuit 16, an audio processing circuit 18, and a controller 20. The communication module 10 may also include a transceiver port 22 to interface the transceiver circuit 16 to one or more antennas (not shown), a user interface port 24 to electrically connect the communication module 10 to a user interface, and one or more peripheral ports 26 to connect the communication module 10 to one or more peripheral devices (not shown). As seen in FIG. 2, the user interface may include, inter alia, a keypad 32, a speaker 34, a display 36, and a microphone 38.

Memory 14 represents the entire hierarchy of memory in module 10, including, but not limited to, non-volatile random access memory (RAM), volatile RAM (flash memory), and read-only memory (ROM). Memory 14 may store the operating instructions and the data required for the operation of module 10, such as the network interface 28 of the present invention, as well as application instructions and user data. Memory 14 may be embodied in devices such as EPROM, EEPROM, and/or flash memory, and may be implemented as a discrete device, stacked device, or integrated with controller 20.

Transceiver circuit 16 comprises the circuitry necessary for communicating signals and data to and from one or more communication networks. For wireless network, such as circuit-switched and packet-switched networks, the transceiver circuit 16 couples to an antenna (not shown) via a transceiver port 22. Transceiver 16 may be, for example, a fully functional cellular radio transceiver that operates according to standards well known in the art, including Global System for Mobile Communications (GSM), General Packet Radio Service (GPRS), TIA/EIA-136, cdmaOne, cdma2000, UMTS, Wideband CDMA, High Speed Downlink Packet Access (HSDPA), and High Speed Uplink Packet Access (HSUPA). Alternatively, transceiver circuit 16 may be one or more components that communicate signals with a fully functional cellular transceiver housed within the wireless communication device 30.

Audio processing circuit 18 provides basic analog output signals to speaker 34 and accepts analog audio inputs from microphone 38 (FIG. 2) via user interface port 24. The peripheral ports 26 facilitate electrical connections to one or more peripheral devices. Examples of the ports 26 include, but are not limited to, a Universal Asynchronous Receiver/Transmitter (UART) port, a Universal Serial Bus (USB) port, and a General Purpose I/O (GP I/O) port.

Controller 20 interconnects the memory 14, transceiver circuit 16, and audio processing circuit 18, and generally controls the operation of module 10 according to instructions and data stored in memory 14. Controller 20 also controls the flow of signals to the various ports 22, 24, and 26 to effect communications with the components connected thereto. The controller 20 may, for example, be implemented as one or more general purpose or special purpose microprocessors. As described in more detail later, controller 20 is configured to invoke the network interface 28 to interface an SMS application executing on the wireless communication device 30 and an IP protocol layer, and to use the network interface 28 to process specially designated SMS messages.

Figure 3:
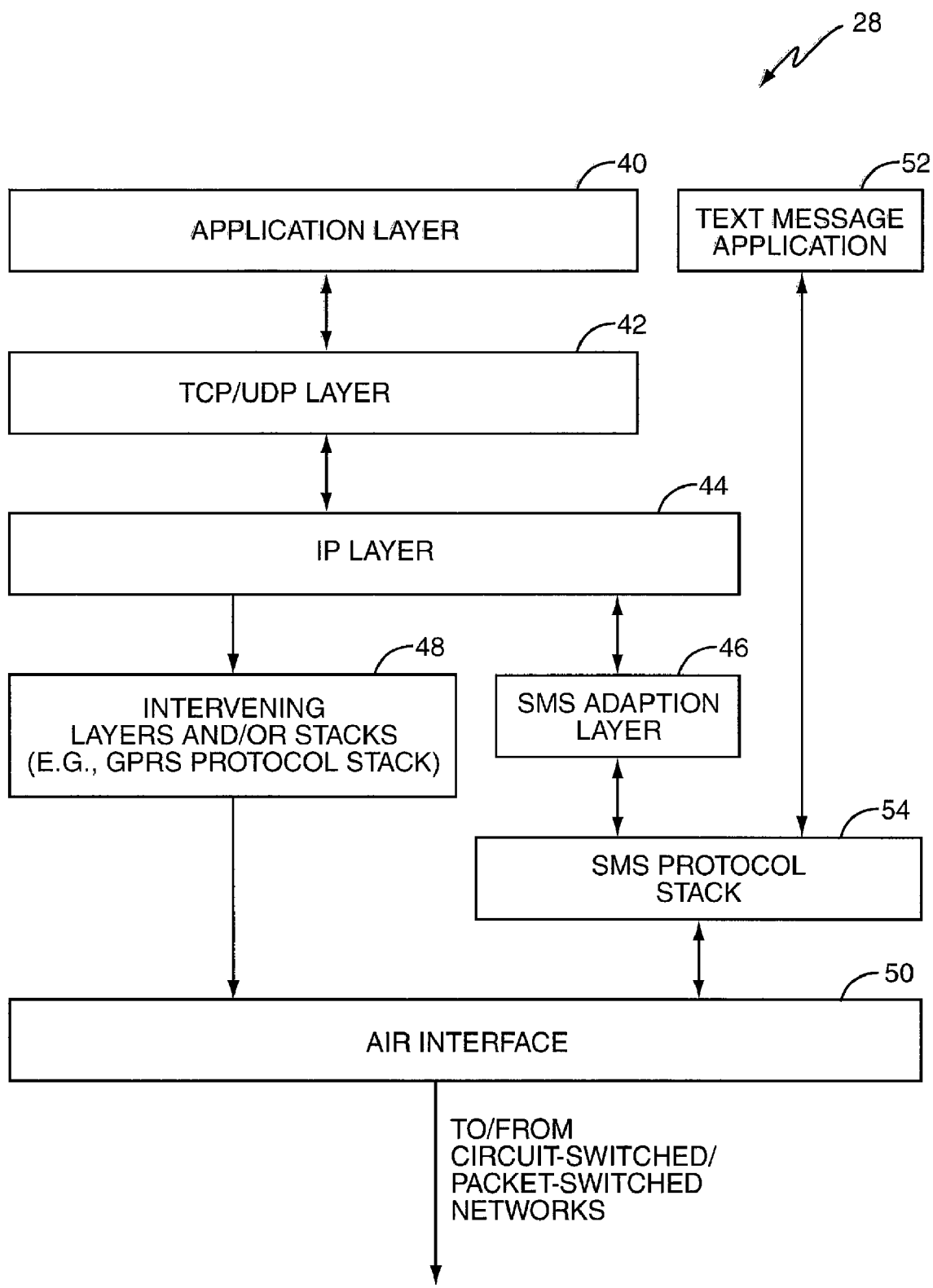
FIG. 3 is a block diagram that illustrates a protocol stack having an adaptation layer according to one embodiment of the present invention.

FIG. 3 illustrates a logical view of the network interface 28 according to one embodiment of the present invention. Network interface 28 comprises an SMS adaptation layer 46 that interfaces with a protocol stack. The protocol stack may include an application layer 40, a transport layer 42, a network layer 44, one or more intervening layers and/or protocol stacks (e.g., a GPRS protocol stack), and communicates messages with a wireless communication network via an air interface 50. While not specifically shown in the figures, the protocol stack may also include other protocol layers such as a presentation layer and a session control layer. These additional layers are not pertinent to the present invention and have been omitted for simplicity.

In addition, for devices equipped with SMS functionality, the protocol stack may include a text message application 52 to allow users to enter and read SMS messages, and an SMS protocol stack 54 to communicate those SMS messages to and from the circuit-switched network as is known in the art. As described in more detail below, the SMS adaptation layer 46 of the present invention interfaces the IP layer 42 with the SMS protocol stack 54 to facilitate transmitting and receiving IP packets using an SMS messaging framework. Such an interface allows short messages and commands to be communicated over the circuit-switched network in situations where high latency and limited bandwidth may not be a concern.

The application layer 40 resides above the transport layer 42, and interfaces directly with one or more application processes executing on wireless communication device 30. One example of an application process is the text message application 52 that allows a user to send and receive SMS messages to and from a circuit-switched network. Generally, the application layer 40 performs application services for the application processes, and communicates information and data between the application processes and the transport layer 42 via an intervening presentation layer and a session control protocol (SCP) layer (not shown).

The transport layer 42 resides below the application layer 40 and above the IP layer 44. The transport layer 42 facilitates the transparent transfer of data between end users thereby relieving the higher protocol layers from the concerns associated with reliable data transport. In some embodiments, the transport layer 42 comprises a connection-oriented Transmission Control Protocol (TCP). In these cases, TCP provides end-to-end error recovery and flow control, and ensures complete data transfer between end users. In other embodiments, transport layer 42 comprises a connectionless-oriented User Datagram Protocol (UDP). Typically, the UDP does not provide either the error recovery or the flow control functionality of TCP, but rather, leaves these functions to the application.

The IP protocol layer 44 resides below the transport layer 42 and above the air interface 50. The IP protocol layer 44 is responsible for encapsulating data received from the transport layer 42 inside one or more IP packets or datagrams. These IP packets are then sent to the air interface 50 for transmission to the packet-switched network via one or more intervening layers and/or protocol stacks 48, or to the SMS adaptation layer 46 for further processing according to the present invention. The encapsulation provided by the IP protocol layer 44 abstracts the underlying data from the higher layer protocols to hide the IP packet formatting or addressing considerations from these layers.

The SMS adaptation layer 46 resides below the IP protocol layer 44 and above the air interface 50. According to the present invention, the SMS adaptation layer 46 interfaces the IP protocol layer 44 with the SMS protocol stack. This allows for the communication of IP packets embedded in SMS messages between communication devices. In one particular embodiment, the SMS adaptation layer 46 permits a remote device equipped with the communication module 10 to control the operation of the wireless communications device 30 according to control information and/or other data embedded in specially designated SMS messages.

Figure 5:
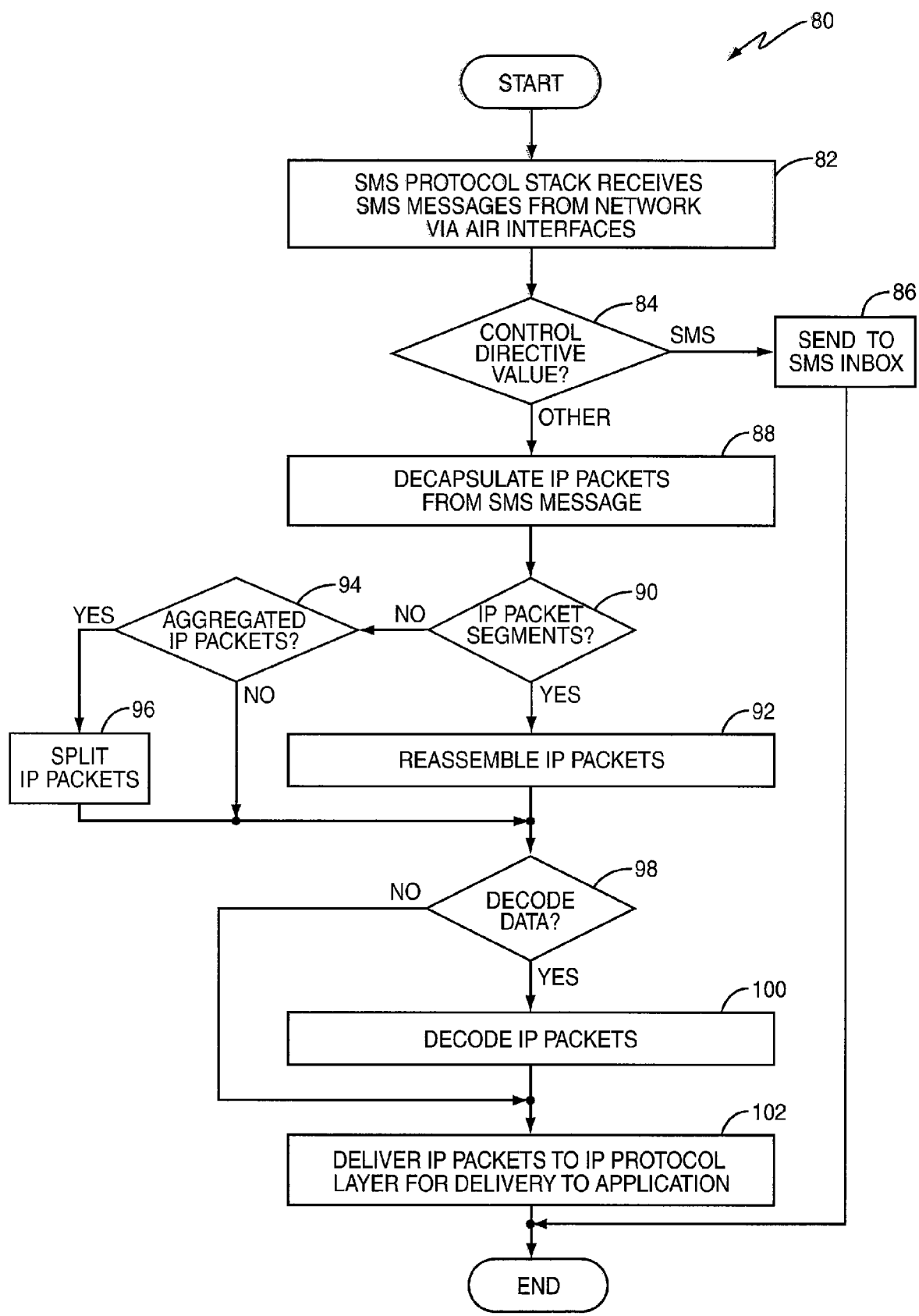
FIG. 5 is a flow diagram that illustrates a method of receiving messages from a wireless communications network according to one embodiment of the present invention.

FIG. 5 shows a method 60 wherein the SMS adaptation layer 46 interfaces with the SMS protocol layer 54 to allow for the generation and transmission of specially designated SMS messages to remote devices equipped with the communication module 10. Method 60 assumes that an application has generated the data and/or commands that will be transmitted in the specially designated SMS messages, and that the data and/or commands have been communicated from the application to the IP layer 44.

Figure 4:
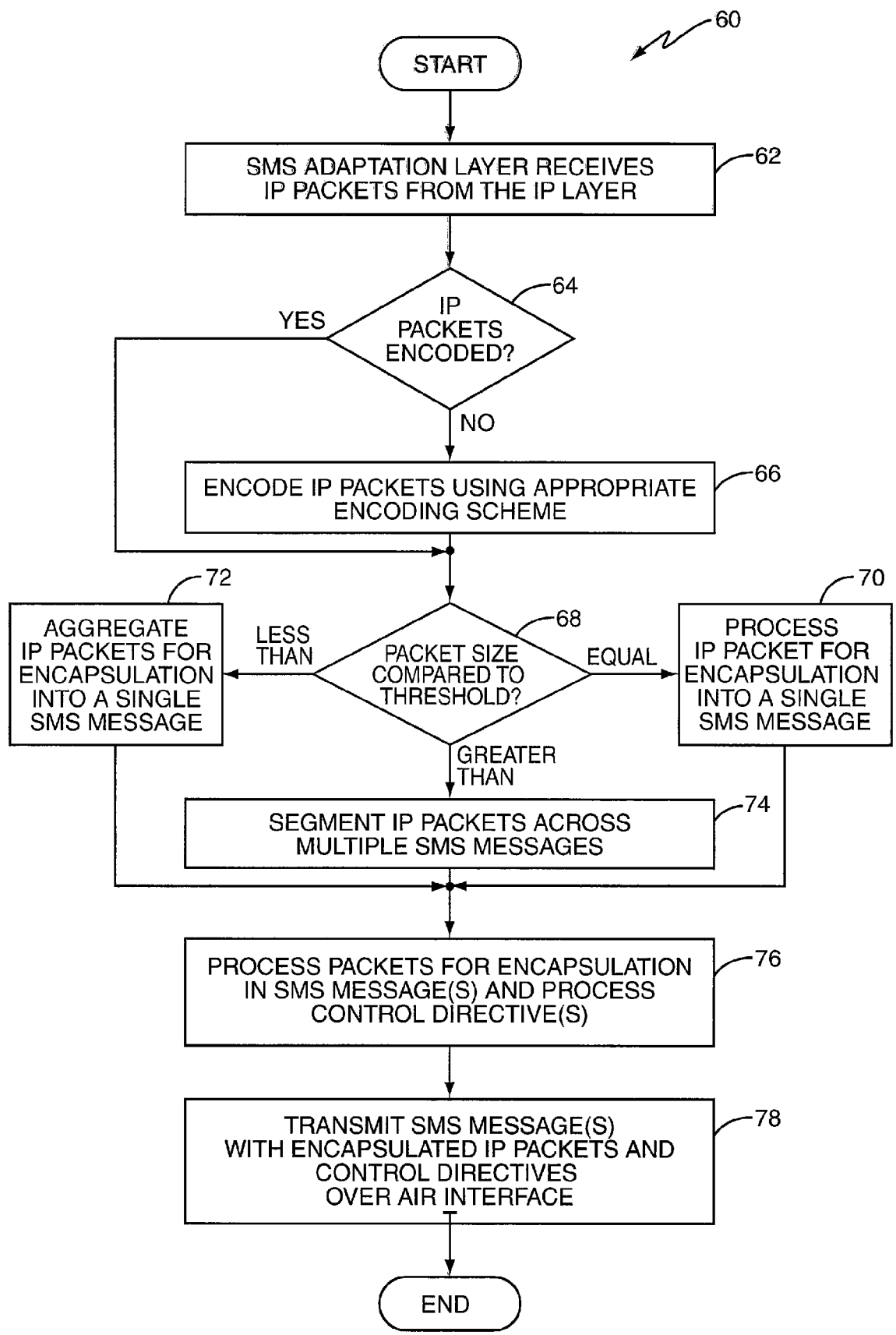
FIG. 4 is a flow diagram that illustrates a method of generating messages for transmission to a wireless communications network according to one embodiment of the present invention.

As seen in FIG. 4, the SMS adaptation layer 46 receives IP packets from the IP protocol layer (box 62). Some applications may provide the data and/or commands already encoded to the IP layer 44; however, others may not. Therefore, upon receipt of the IP packets, the SMS adaptation layer 46 determines whether encoding should be performed (box 64), and encodes the IP packets as needed or desired (box 66). In one embodiment, the SMS adaptation layer 46 employs a base-64 encoding scheme to produce encoded text, although the SMS adaptation layer 46 may use any encoding algorithm known in the art.

The SMS adaptation layer 46 also determines whether the size of the IP packets exceed a predetermined threshold and process the IP packets based on the determined size (box 68). If the size of the IP packet is equal to the threshold value, the SMS adaptation layer 46 will process the IP packet for inclusion in a single SMS message (box 70). If the SMS adaptation layer 46 receives a plurality of IP packets with a total size that is less than the threshold, the SMS adaptation layer 46 may aggregate the multiple IP packets for inclusion into a single SMS message (box 72). If the SMS adaptation layer 46 receives an IP packet having a size that exceeds the threshold, the SMS adaptation layer 46 may segment the IP packet into a plurality of IP packet segments for inclusion into a plurality of SMS messages.

The SMS adaptation layer 46 then processes the IP packets for inclusion into one or more SMS messages, processes a control directive for inclusion in the SMS message header (box 76), and forwards the SMS messages to the SMS protocol stack 54. The SMS protocol stack 54 then processes the IP packets and the control directive received from the SMS adaptation layer 44 for transmission to a remote communication device over the circuit-switched network (box 78).

It should be noted that the SMS adaptation layer 46 may process the IP packets and the control directive based on the functionality of the SMS protocol stack 54. Specifically, not all SMS protocol stacks 54 operate in the same manner. Most SMS protocol stacks 54 insert the SMS message headers and footers and provide the functionality that enables the SMS messages to be transmitted and received over established communication links. However, some SMS protocol stacks 54 might not include the functionality needed to encapsulate the IP packets into the SMS messages, and insert the control directive. Therefore, in one embodiment, the SMS adaptation layer 44 encapsulates the IP packets into one or more SMS messages and inserts the control directive into an SMS header. The SMS message is then output to the SMS protocol stack 54 for further processing and transmission over the air interface 50. In embodiments where the SMS protocol layer 54 does provide such functionality, the SMS adaptation layer 54 simply outputs the IP packets and the control directive to the SMS protocol stack 54. The SMS protocol stack 54 could then encapsulate the IP packets into the SMS message and insert the control directive into the SMS header before outputting the SMS message to the air interface 50. In some embodiments, the SMS adaptation layer 46 and the SMS protocol stack 54 may share the encapsulation and control directive insertion functionality.

The control directive inserted into the SMS header may represent one or more commands that indicate how the receiving wireless communication device 30 should process the SMS message and/or encapsulated IP packets. For example, the control directive may indicate that the SMS messages include encapsulated IP packets, and thus, should be processed through the SMS adaptation layer 44. Other control directives may indicate whether the SMS messages include IP packet segments, a plurality of aggregated IP packets, or whether the SMS message contains a single IP packet. Other information that may be communicated by the control directive is whether the transmitting wireless communication device 30 encoded the IP packets, and if so, according to what encoding scheme.

Thus, the control directive allows the transmitting module 10 to specify how the receiving device should process the incoming SMS messages on a message-by-message basis. The control directive may be, for example, one or more bytes or other indicators in the SMS message header that identifies the SMS message for conventional handling or special handling. In one embodiment of the present invention, a single control directive is used to convey commands to the receiving wireless communication device 30. However, in other embodiments, a plurality of control directives are inserted into the SMS message, each representing a different command to control a different function of the receiving wireless communication device 30.

FIG. 5 illustrates a method 80 by which a receiving wireless communication device 30 utilizes the SMS adaptation layer 46 to handle incoming SMS messages. Method 80 begins when the SMS protocol stack 54 executing on the receiving wireless communication device 30 receives one or more SMS messages from the circuit-switched network via the air interface 50 (box 82). The SMS protocol stack 54 determines from the control directive in the SMS message header whether the incoming SMS messages are conventional SMS messages or specially designated SMS messages (box 84). For conventional SMS messages, the SMS protocol stack 54 forwards the SMS messages to an SMS inbox for later retrieval by the user (box 86). For specially designated SMS messages, the SMS protocol stack 54 forwards the SMS messages to the SMS adaptation layer 46.

Upon receipt of the SMS messages, the SMS adaptation layer 46 decapsulates the IP packets from the SMS messages (box 88) and determines whether the SMS messages comprise IP packet segments, a plurality of aggregated IP packets, or a single IP packet (boxes 90, 92). The SMS adaptation layer 46 may determine this information, for example, through the use of a control directive or other information in the SMS messages. If the SMS messages carried IP packet segments, the SMS adaptation layer 46 re-assembles the decapsulated IP packet segments (box 92). If the SMS message carried a plurality of aggregated IP packets, the SMS adaptation layer 46 separates the IP packets (box 96). Otherwise, the decapsulated IP packet represents a single IP packet.

The SMS adaptation layer 46 may determine from the control directive or other information sent with the SMS message whether the IP packets were encoded as well as the encoding scheme used to encode the packets (box 98), and decode the IP packets as needed (box 100). The SMS adaptation layer 46 then forwards the decoded IP packets to the IP protocol layer 44 for further processing and delivery to an application executing on the receiving wireless communication device 30 (box 102).

The present invention may be useful in situations where low bandwidth and high latency are not problematic for communicating information. In one exemplary embodiment, the present invention may be utilized to request information from a communication module 10 such as its IP address. Particularly, the communication module 10 typically has a telephone number that is known to a calling party. This allows calling devices to place calls and send SMS messages to the communication module 10 via a circuit-switched network. However, communication module 10 does not always have an IP address that is known to the calling party. This hinders the ability of some devices to "push" large amounts of data to the communication module over the packet-switched network, which is better suited to this type of data transfer than is the circuit-switched network.

Figure 6:
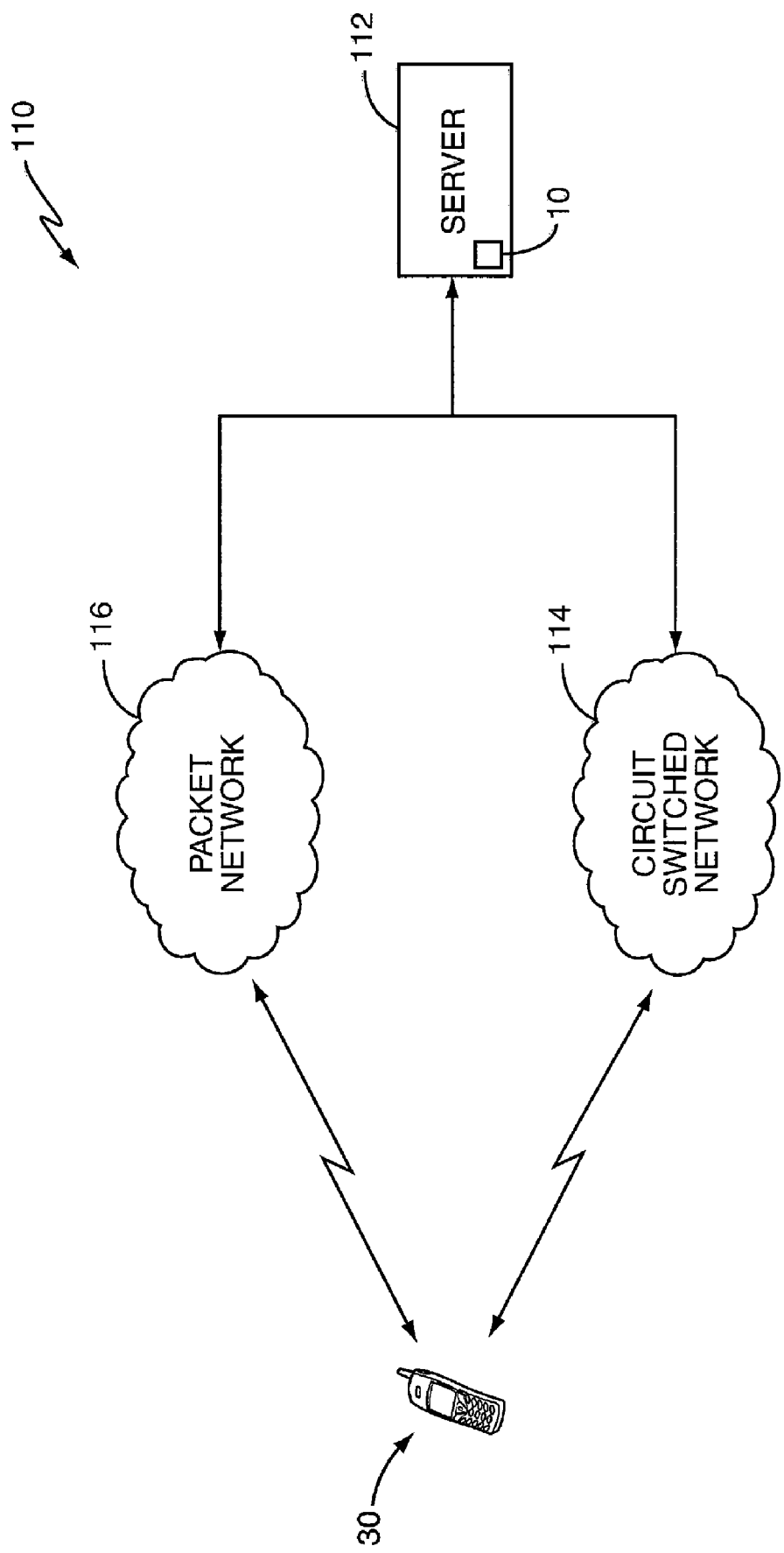
FIG. 6 is a block diagram that illustrates a wireless communications device configured according to one embodiment of the present invention communicating with a network.

FIG. 6, for example, illustrates an embodiment where a communication system 110 connects a wireless communication device 30 to a control server 112, each of which includes a communication module 10. Server 112 may be, for example, a control server designed to "push" large amounts of data such as firmware upgrades and/or other data to the wireless communication device 30. The communication system 110 includes both a circuit-switched network 114 (e.g., a GSM network) and a packet-switched network 116 (e.g., a GPRS network).

Server 112 might not know the IP address of the wireless communication device 30, but could know the telephone number of the wireless communication device 30. Therefore, an application executing on server 112 could generate and transmit a request message requesting the wireless communication device 30 to return its IP address.

Figure 7:
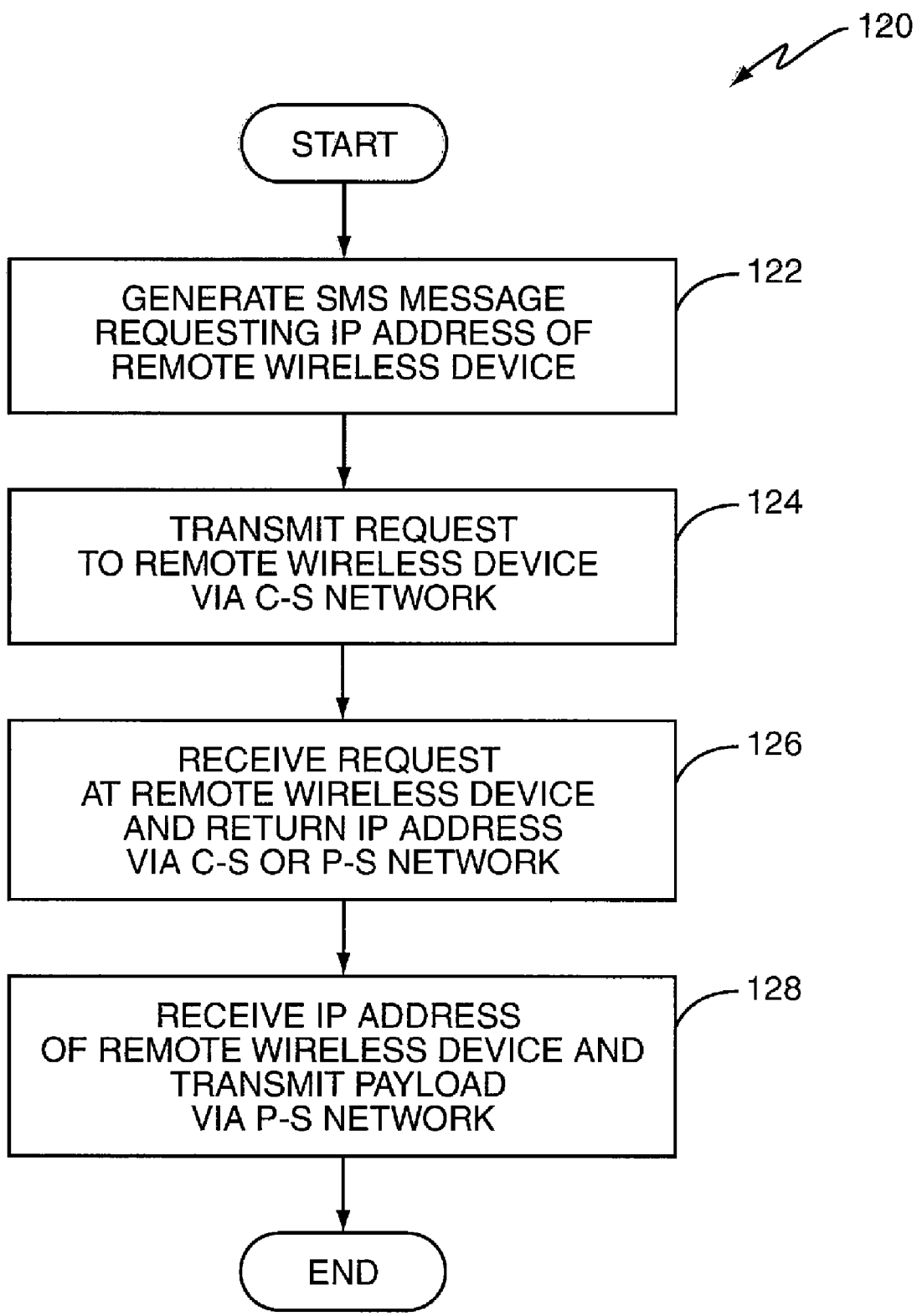
FIG. 7 is a flow diagram that illustrates a method of communicating information over the network of FIG. 6 according to one embodiment of the present invention.

FIG. 7, for example, illustrates an exemplary method 120 by which a server 112 may control a wireless communication device 30 to return its IP address. The method 120 begins when the server 112 generates an SMS message according to the method 60 previously described. The SMS message might include a command or request message requesting that the wireless communication device 30 provide its IP address to the server 112 (box 122). Server 112 would transmit the SMS message to the wireless communication device 30 via the circuit-switched network 92 (box 124). Upon receiving the SMS message, the SMS protocol stack 54 operating on the wireless communication device 30 forwards the incoming SMS message to the SMS adaptation layer 46 based on the control directive, which may process the SMS message and the IP packets according to the method 80 previously described.

If the wireless communication device 30 already has an IP address, it may retrieve the IP address from memory 14 and generate a return SMS message for transmission to the server 112. Alternatively, if the wireless communication device 30 does not have an IP address or has a "stale" IP address, the wireless communication device 30 could obtain an IP address from the packet-switched network as known in the art. In either case, the wireless communication device 30 could generate the return SMS message according to the method 60 discussed above, and send that SMS message to the server 112 (box 126). Upon receipt, the SMS adaptation layer 46 at the server 112 operates as previously described to process the received SMS message and deliver the IP address to the application executing the firmware upgrades (box 128). That application could then establish a packet-switched communication link with the wireless communication device 30 and push the firmware upgrade to the device.

The embodiment of FIG. 7 allows a requesting device that includes the network interface 28 of the present invention to establish a packet-switched channel with a remote device even when the requesting device does not know the IP address of the remote device beforehand. This permits the devices to share potentially large amounts of data over a more efficient medium. However, those skilled in the art will readily appreciate that the present invention may also be used to pass information over a circuit-switched network as well. For example, where low bandwidth and high latency is not a problem, two or more devices may communicate data in one or more IP packets encapsulated in one or more SMS messages via the circuit-switched network. Particularly, a single SMS message can contain up to 255 bytes. However, where large amounts of data are concerned, a plurality of SMS messages can be concatenated and communicated between devices. Each of the SMS messages may include one, more than one, or parts of an IP packet.

The previous embodiments specifically place one or more control directives in a header of the SMS messages; however, this is for illustrative purposes only. The control directives, which may be embodied as one or more bytes, flags, indicators, symbols, or other values, may be inserted anywhere in the SMS messages communicated between the devices. In one embodiment, for example, a control directive inserted into the SMS message header controls the SMS message handling procedures at the receiving device. Additional control directives, commands, or requests carried by the encapsulated IP packets can then further control the operation of the receiving device upon delivery to an application designed to execute functionality based on those commands.

It should be noted that while the figures and embodiments describe the transport layer as being a TCP/UDP layer, the present invention is not so limited. The transport layer 42 may be, for example, a Simple Mail Transfer Protocol layer used to data between servers connected via the Internet, or some proprietary transport layer. Additionally, the presence of the transport layer 42 is not required for the present invention. The application layer 40 or other higher level layer may communicate directly with the IP layer 46.

Additionally, the communication devices described herein are specifically described as being wireless communication devices 30 that communicate wireless signals via a circuit-switched and/or packet-switched network. However, the present invention is not so limited. The present invention may be carried out by any device that includes the network interface 28. By way of example only, a communication module 10 having the network interface 28 may be disposed in an automatic beverage or food dispensing machine, a power meter, a weather station, or other device capable of communicating with a remote device equipped with the network interface 28.

Further, the previous embodiments describe the SMS adaptation layer 46 as using a base-64 scheme to encode/decode the IP packets. However, those skilled in the art will realize that the present invention may employ other encoding/decoding schemes, or may use no encoding/decoding scheme. In one embodiment, for example, the IP packets encapsulated in the SMS messages include plain text. In other embodiments, the IP packets include binary data.

In another embodiment, the SMS adaptation layer generates the encoded text using a desired encoding scheme, and then "wraps" the encoded text in tags. The tags may be, for example, eXtended Markup Language (XML) tags, as seen in the following example.

```
<IP>
    [.....encoded text ...]
</IP>
```

In this example, the tags <IP> and </IP> identify the beginning and the end of the encoded text.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting Internet Protocol (IP) packets in Short Messaging Service (SMS) messages, the method comprising:
   interfacing an IP protocol layer and an SMS protocol stack with an adaptation layer;
   receiving, at the adaptation layer, one or more IP packets from the IP protocol layer;

processing the one or more IP packets at the adaptation layer to be encapsulated in one or more SMS messages by:
    inserting the one or more IP packets into the one or more SMS messages; and
    inserting a control directive into the headers of the one or more SMS messages to control IP packet handling at a remote communication module; and
outputting the one or more SMS messages having the encapsulated IP packets and the inserted control directive from the adaptation layer to the SMS protocol stack for transmission to the remote communication module.

2. The method of claim 1 wherein processing the IP packet at the adaptation layer comprises:
    determining whether the IP packet should be encoded; and
    encoding the one or more IP packets to generate encoded text based on the determination.

3. The method of claim 1 further comprising determining a size of the one or more IP packets received from the IP protocol layer.

4. The method of claim 3 further comprising segmenting an IP packet to produce IP packet segments if the determined size of the IP packet exceeds a predetermined threshold.

5. The method of claim 3 further comprising aggregating a plurality of IP packets for encapsulation into a single SMS message if the determined total size of the plurality of IP packets does not exceed a predetermined threshold.

6. The method of claim 1 wherein outputting the processed one or more IP packets from the adaptation layer to the SMS protocol stack comprises forwarding the one or more IP packets received from the IP protocol layer to the SMS protocol stack along with one or more control directives.

7. A communication module comprising:
    a transmitter circuit to transmit one or more SMS messages having encapsulated IP packets to a remote communication module over a communication network;
    an IP protocol layer to generate IP packets based on data received from an application;
    an SMS protocol stack to output the one or more SMS messages to the transmitter circuit; and
    an adaptation layer configured to:
        encapsulate one or more IP packets received from the IP protocol layer into the one or more SMS messages;
        insert a control directive into the headers of the one or more SMS messages to control IP packet handling at the remote communication module; and
        output the one or more SMS messages having the encapsulated IP packets and the inserted control directive to the SMS protocol stack.

8. The communication module of claim 7 wherein the adaptation layer is configured to:
    determine if the one or more IP packets should be encoded; and
    encode the one or more IP packets based on the determination.

9. The communication module of claim 8 wherein the adaptation layer is configured to encode the one or more IP packets to generate encoded text.

10. The communication module of claim 7 wherein the adaptation layer is configured to determine a size of the one or more IP packets received from the IP protocol layer.

11. The communication module of claim 10 wherein the adaptation layer is configured to segment an IP packet to produce IP packet segments if the size of the IP packet exceeds a predetermined threshold.

12. The communication module of claim 10 wherein the adaptation layer is configured to aggregate a plurality of IP packets received from the IP protocol layer for encapsulation into a single SMS message if a total size of the plurality of IP packets does not exceed a predetermined threshold.

13. The communication module of claim 7 wherein the adaptation layer is configured to output the one or more IP packets received from the IP protocol layer and one or more control directives to the SMS protocol stack.

14. A method of receiving Internet Protocol (IP) packets in Short Messaging Service (SMS) messages at a communication module, the method comprising:
    interfacing an SMS protocol stack and an IP protocol layer with an adaptation layer, the SMS protocol stack configured to receive SMS messages having encapsulated IP packets from a communication network;
    receiving, at the adaptation layer, one or more SMS messages from the SMS protocol stack responsive to a control directive embedded in the headers of the one or more SMS messages;
    processing the encapsulated IP packets in the one or more SMS messages at the adaptation layer according to the control directives; and
    outputting one or more IP packets decapsulated from the one or more SMS messages to an application through the IP protocol layer.

15. The method of claim 14 wherein processing the one or more SMS messages at the adaptation layer comprises decapsulating the IP packets from the one or more SMS messages to produce the decapsulated IP packets.

16. The method of claim 14 wherein processing the one or more SMS messages at the adaptation layer comprises reassembling a plurality of decapsulated IP packet segments.

17. The method of claim 14 wherein processing the one or more SMS messages at the adaptation layer comprises separating a plurality of IP packets encapsulated in a single SMS message.

18. The method of claim 14 further comprising:
    determining whether the decapsulated IP packets should be decoded; and
    decoding the decapsulated IP packets to produce decoded text based on the determination.

19. The method of claim 14 wherein outputting the one or more IP packets decapsulated from the one or more SMS messages to an application through the IP protocol layer comprises forwarding one or more decapsulated IP packets and one or more control directives received from the SMS protocol stack to the IP protocol layer.

20. A communication module comprising:
    a receiver circuit to receive SMS messages comprising one or more encapsulated IP packets from a communication network;
    an SMS protocol stack to receive the SMS messages from the receiver circuit;
    an IP protocol layer to forward IP packets to an application; and
    an adaptation layer configured to:
        process one or more SMS messages received from the SMS protocol stack responsive to a control directive embedded in the headers of the one or more SMS messages, the control directives specifying how the adaptation layer should process the one or more IP packets; and
        output one or more IP packets decapsulated from the one or more SMS messages to the IP protocol layer.

21. The communication module of claim 20 wherein the adaptation layer is configured to decapsulate the one or more IP packets from the one or more SMS messages.

22. The communication module of claim 20 wherein the adaptation layer is configured to reassemble one or more decapsulated IP packet segments.

23. The communication module of claim 20 wherein the adaptation layer is configured to separate a plurality of decapsulated IP packets encapsulated in a single SMS message.

24. The communication module of claim 20 wherein the adaptation layer is configured to:

determine whether the one or more packets should be decoded; and decode the one or more IP packets to produce decoded text based on the determination.

* * * * *

UNITED STATES PATENT AND TRADEMARK OFFICE
CERTIFICATE OF CORRECTION

PATENT NO. : 7,623,526 B2  Page 1 of 1
APPLICATION NO. : 11/461118
DATED : November 24, 2009
INVENTOR(S) : Rangel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Twenty-sixth Day of October, 2010

David J. Kappos
*Director of the United States Patent and Trademark Office*